(No Model.)

J. H. WALKER.
FENDER FOR VEHICLE WHEELS.

No. 539,494. Patented May 21, 1895.

Witnesses
E. J. Nottingham
G. F. Downing

Inventor
J. H. Walker
By H. A. Seymour
Attorney.

THE NORRIS PETERS CO., PHOTO-LITHO., WASHINGTON, D. C.

UNITED STATES PATENT OFFICE.

JOSEPH H. WALKER, OF WORCESTER, MASSACHUSETTS.

FENDER FOR VEHICLE-WHEELS.

SPECIFICATION forming part of Letters Patent No. 539,494, dated May 21, 1895.

Application filed April 28, 1894. Serial No. 509,383. (No model.)

*To all whom it may concern:*

Be it known that I, JOSEPH H. WALKER, of Worcester, in the county of Worcester and State of Massachusetts, have invented certain new and useful Improvements in Guards or Fenders for Vehicle-Wheels; and I do hereby declare the following to be a full, clear, and exact description of the invention, such as will enable others skilled in the art to which it appertains to make and use the same.

My invention relates to an improvement in mud guards or fenders for vehicle wheels, the object being to provide a guard or fender carried by the axle and provided with a movable section adapted to yield when brought in contact with the sill or side of the vehicle as in turning.

A further object is to so construct said adjustable section that in the event of injury it can be readily removed and a new section introduced at a nominal cost.

A further object is to provide the rear end of the fenders with a removable extension.

With these objects in view my invention consists in certain novel features of construction and combinations of parts as will be hereinafter more fully described and pointed out in the claims.

Figure 1:
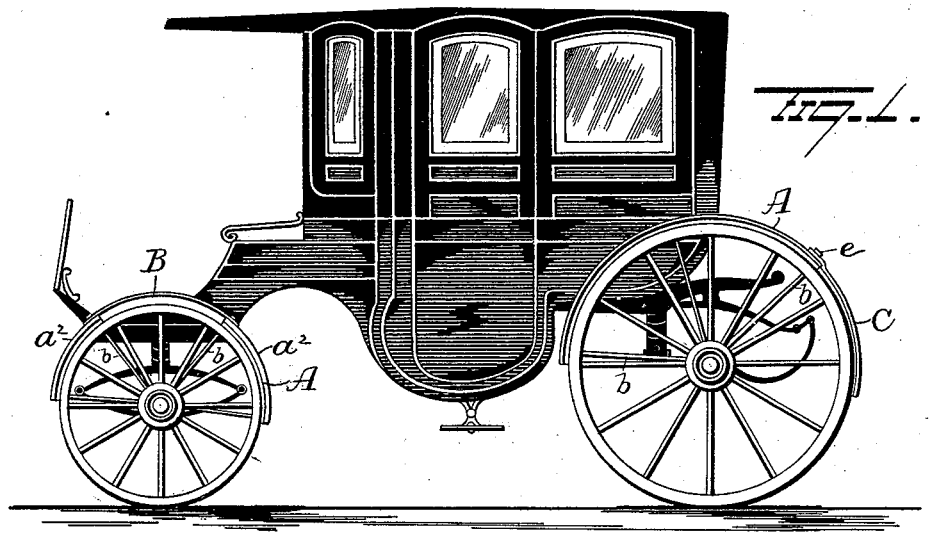
Figure 3:
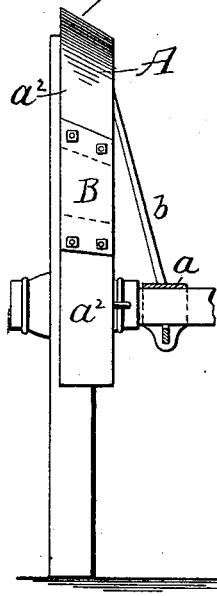
Figure 2:
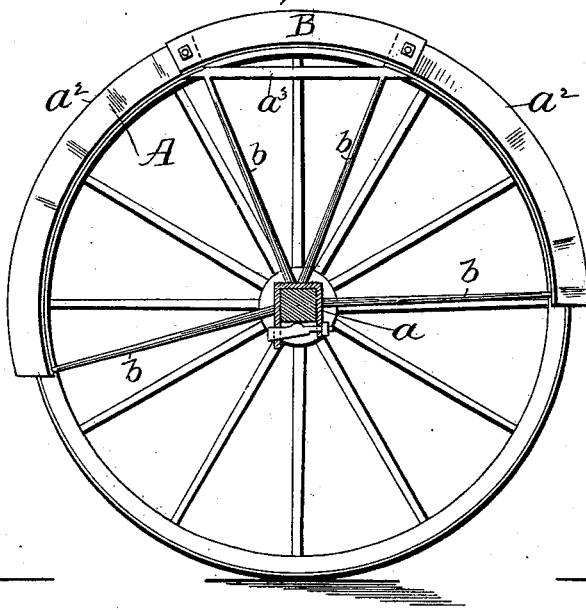

In the accompanying drawings, Figure 1 is a view of my improvement in its operative position on a vehicle. Fig. 2 is a view in side elevation of the front wheel shown in Fig. 1. Fig. 3 is a view in end elevation, showing a wheel designed for use on side-bar vehicles; and Fig. 4 is a view of one of the rear fenders.

Figure 4:
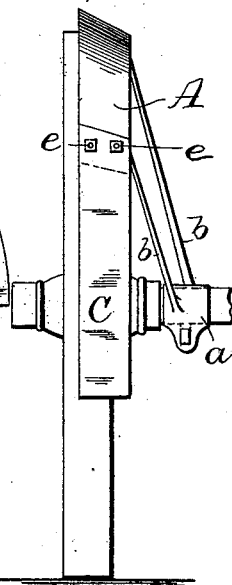

A represents a front wheel fender constructed of any suitable material, it being preferably a single flange and set obliquely as shown in Figs. 3 and 4, and $b$, the supporting arms thereof, which latter terminate and are secured to the yoke $a$, through the medium of which rigid connection to the axle is maintained.

Fender A is provided with movable section B, which latter is secured at its ends to the adjacent ends of the main or rigid section $a^2$ of the fender A.

It is desirable to provide the front as well as the rear wheels of a vehicle with fenders or guards which can be removed when not necessary and applied in a few minutes when the streets or roads are in a wet and muddy condition. Fenders to be serviceable on the front wheels must maintain a proper relation to the wheels so as to cover them in all positions. Hence in order to fulfill these conditions the fenders must move with the axle in order to cover the wheels when in all positions, and to this end it is essential to attach the fenders to the axles. In some vehicles the front wheel can turn under the bottom, sufficient space being provided for this purpose. In other vehicles however a fender carried by the axle might come in contact with the bottom and hence in order to prevent injury to the fenders I have provided them with yielding top sections which when they contact with the bottom of the vehicle will yield or give and permit of the free movement of the axle and wheels as in turning a corner without injury to the fender. This yielding or movable section B, is preferably made of thin sheet metal sufficiently pliable to permit it to give or yield when engaged by the carriage and assume its normal position when disengaged, but if desired it can be made of rubber, leather, stiff paper or any other material that will give or yield without rupturing, and if desired when material not possessing sufficient elasticity in itself to cause it to assume its normal position when disengaged, is employed, such material can be mounted on steel or other yielding ribs or frame-work which will supply the necessary elasticity.

When the fender is designed for use on vehicles having side bars, the yielding section instead of being centrally located as shown in Figs. 1 and 2, is located to the rear in a position to engage the side bar as shown in Fig. 3.

Instead of employing thin steel or other flexible material such as I have described, the yielding section can be made of a cheap material that will give or rupture under continued pressure, and when once ruptured can be readily and quickly replaced by another at a very slight expense.

Fender A, is made in the arc of a circle and when fitted in position is bent so as to conform to the contour of the wheel and rest parallel with same and when so bent is adapted to project in an oblique direction a sufficient distance above or below the tire to stop mud thrown up by the wheel.

The fender above described is specially designed for use in connection with the front wheels of vehicles and when applied for protecting the rear wheels thereof, the yielding or movable section B, is omitted, the same being unnecessary, for the reason that the rear axle is stationary and consequently the wheels carried thereby do not at any time change their positions relative to the vehicle body.

A supplemental fender or extension C, constructed of any desired material is adapted to be removably secured to the rear end of fender A, said connection being preferably made by means of bolts $e$. By this arrangement of parts the main fender can be somewhat shortened and as the supplemental fender of extension C, is detachably connected thereto, the washing of the vehicle is more easily accomplished than if main fender extended the full distance.

The fenders are connected by braces $b$ to the yokes $a$ which latter are preferably angular in cross section and open at the bottom, the ends of the yokes projecting below the axles and provided with openings or slots for the passage of tapering bolts which secure the yokes to the axles. By removing the tapering bolts the fenders complete can be removed in a few seconds, and can be replaced in a comparatively short time. These fenders can be applied to the vehicles now in use without the slightest injury to the vehicle.

In the fenders employed on the front wheels, I connect the adjacent ends of the section $a^2$ by the brace $a^3$ which latter tends to maintain the two sections $a^2$ in their proper relative positions.

The braces $b$ are arranged as shown in Fig. 4, one or more (preferably the central ones) being attached to the yoke behind the other braces so as to add to the strength of the structure.

It is evident that changes in the construction and relative arrangement of the several parts might be made without avoiding my invention and hence I would have it understood that I do not restrict myself to the particular construction and arrangement of parts shown and described; but, Having fully described my invention, what I claim as new, and desire to secure by Letters Patent, is—

1. A wheel fender, having a yielding section therein and means for securing said fender to the axle, substantially as set forth.

2. A wheel fender consisting of rigid end sections and a yielding or flexible central section, the latter being secured at its ends to the rigid end sections, substantially as set forth.

3. A wheel fender, consisting essentially of a main section, a yoke to embrace the axle and braces connecting the main section and yoke, and a supplemental section or extension removably attached to the rear end of the main section.

4. A wheel fender, consisting essentially of rigid end sections, a brace connecting said end sections, and a yielding or flexible intermediate section, substantially as set forth.

5. A fender for vehicles consisting of an oblique section curved in the arc of a circle to conform to the shape of the wheel, a rear extension removably attached to this fender, a yoke, and braces extending from the oblique section to the yoke, substantially as set forth.

In testimony whereof I have signed this specification in the presence of two subscribing witnesses.

JOSEPH H. WALKER.

Witnesses:
GEORGE F. DOWNING,
C. S. DRURY.